Oct. 9, 1951 L. D. MILHAN 2,570,260
LATCH ASSEMBLY FOR CONVERTIBLE AUTOMOBILE TOPS
Filed Feb. 19, 1948 3 Sheets-Sheet 1
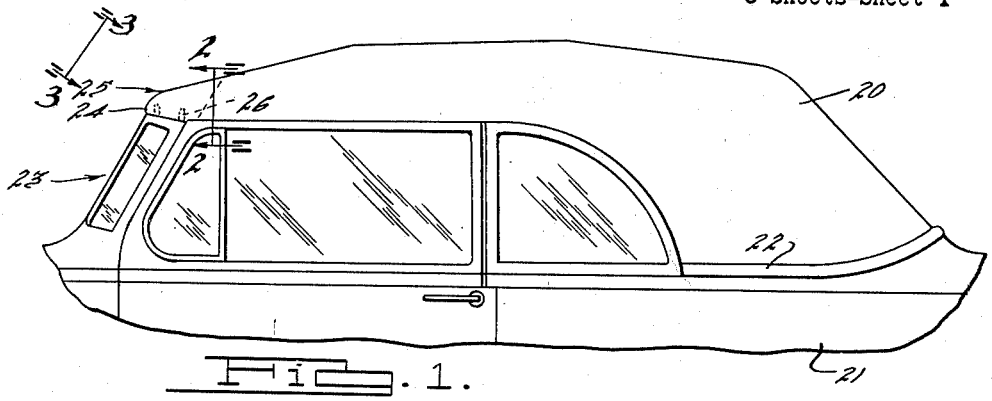
Fig. 1.
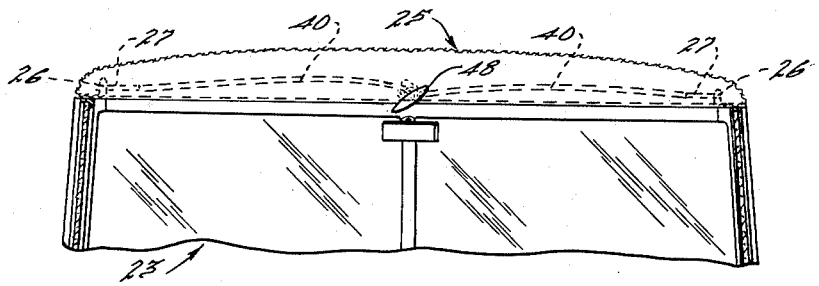
Fig. 2.
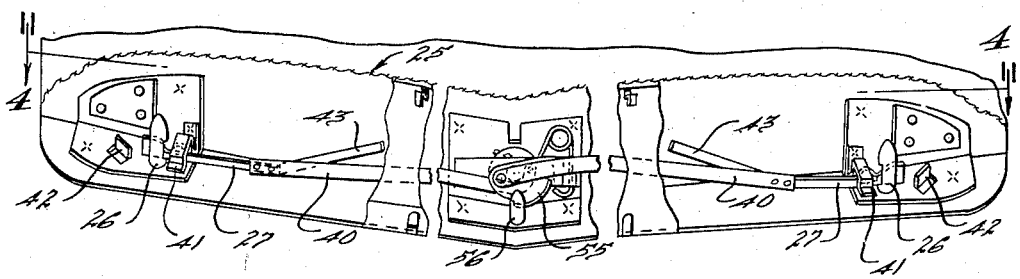
Fig. 3.
Fig. 4.
INVENTOR.
Lewis D. Milhan.
BY Maxwell K. Murphy
ATTORNEY.

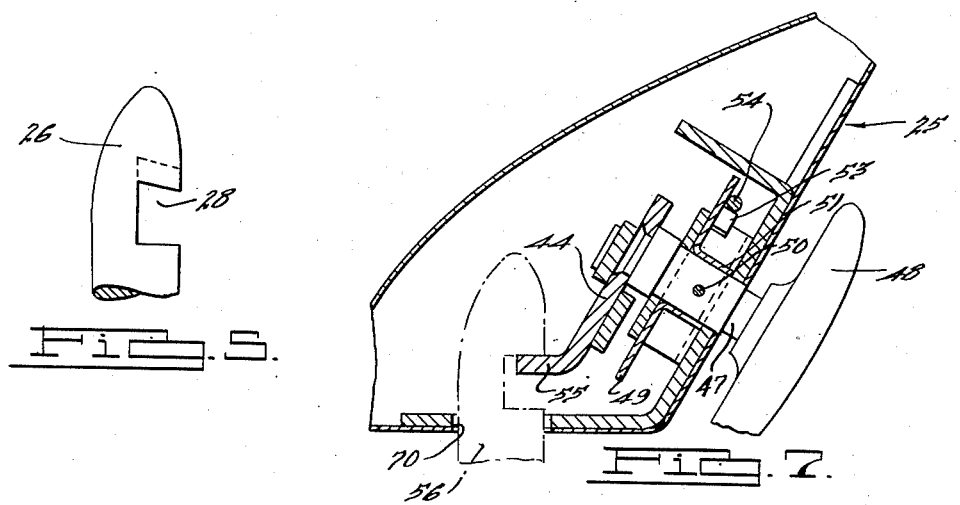

Oct. 9, 1951     L. D. MILHAN     2,570,260
LATCH ASSEMBLY FOR CONVERTIBLE AUTOMOBILE TOPS
Filed Feb. 19, 1948     3 Sheets-Sheet 3
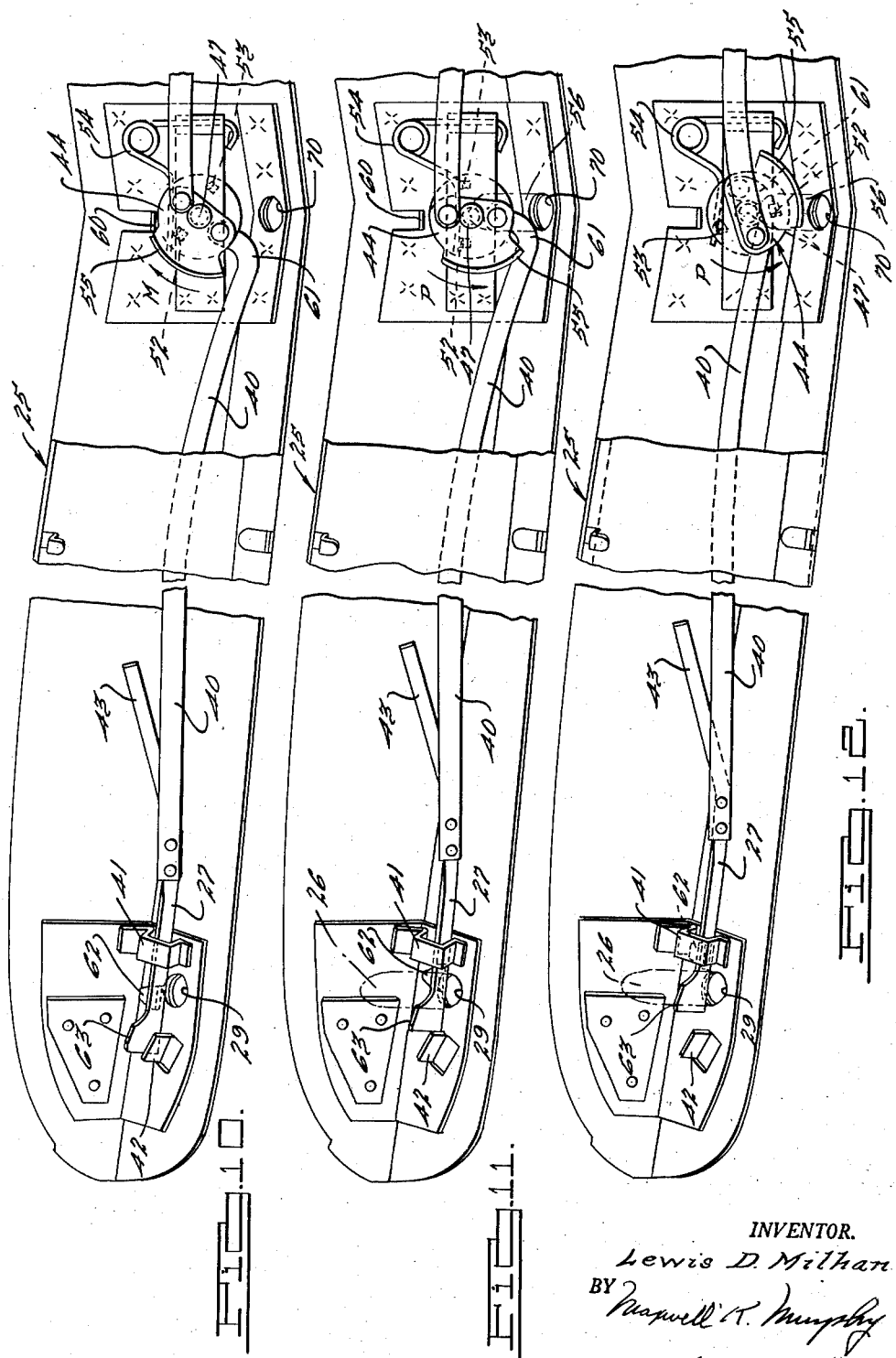
INVENTOR.
Lewis D. Milhan
BY
ATTORNEY Patented Oct. 9, 1951

2,570,260

UNITED STATES PATENT OFFICE 2,570,260

LATCH ASSEMBLY FOR CONVERTIBLE AUTOMOBILE TOPS

Lewis D. Milhan, Detroit, Mich., assignor to F. L. Jacobs Co., Detroit, Mich., a corporation of Michigan Application February 19, 1948, Serial No. 9,403

14 Claims. (Cl. 296—120)

This invention generally relates to collapsible or convertible automobile tops having both a raised and lowered position, and more particularly pertains to a "number-one-bow" or "header" which attaches itself to the windshield when it is positioned and forced down on the windshield at the completion of the top raising action The top can be raised and lowered manually, by screw jacks, hydraulic cylinders, or any other suitable means. U. S. Patents No. 2,264,602 and Re. 21,775 show two types of power mechanism to operate a convertible top but these patents are only illustrative in that any type convertible top or lift can be used with the present invention.

The header in this invention is provided with means to automatically effect a connection between itself and the windshield and manual means to tighten this connection thereby sealing the joint between the header and windshield to prevent air or water from entering the interior of the car via the joint and to eliminate rattles or "working." Means are also provided to loosen the connection and to entirely sever the connection. In other words, the header is capable of latching itself to the windshield, and is manually operable to tighten and lock the latch, to unlock and untighten the latch, or to undo the latch altogether.

It is, therefore, a primary object of the invention to furnish means associated with a convertible top header which will automatically effect a connection between the header and the windshield when the lift mechanism positions the header down on the windshield.

Another object is to provide means associated with the automatic attaching means for tightening and locking the automatic attaching means.

A further object is to provide means associated with the automatic attaching means for effecting a pressure fit between the header and the windshield.

A further object is to provide means for unlocking the latch and for opening the latch so that the top may be lowered.

A still further object is to provide means for tightening and locking the automatic attaching means that are quickly operable as it is only necessary to rotate the handle approximately one half revolution.

These and other objects and advantages will be seen from the following description, the claims, and the drawings in the application which illustrate one preferred embodiment of my invention.

In the drawings:

Figure 1 is a side view of the top portion of an automobile equipped with a convertible top illustrating the dowel connection between the windshield portion of the car body and the "number-one-bow" or "header" of the convertible top.

Fig. 2 is a sectional view of Fig. 1 taken on the line 2—2 thereof looking toward the front of the car from the inside of same showing the dowels at either side and at the center of the windshield and the centrally located operating handle on the header which operates the links shown in dotted lines leading to the side dowels on the windshields.

Fig. 3 is a sectional view of Fig. 1 taken on the line 3—3 thereof looking toward the rear of the car from outside of same showing the header and the operating parts thereof.

Fig. 4 is a top view of Fig. 3 taken in the direction of arrows 4—4 providing a top view of the header and the operating parts thereof.

Fig. 5 is a side view of an end dowel illustrating the cammed or slanted notch of the dowel by broken lines.

Fig. 6 is an enlarged view of the central portion of Fig. 4 showing the parts thereof in greater detail.

Fig. 7 is a sectional view of Fig. 6 taken on the line 7—7 thereof.

Fig. 8 shows the central cam lock and link operating member.

Fig. 9 shows the central spring quadrant member for holding the attachment and lock in the position they are set.

Fig. 10 is an enlarged view of the center and one side of the header as viewed in Fig. 3 showing the parts of the header in the position for removing the header from the windshield.

Fig. 11 is a similar view of the header as seen in Fig. 10 showing the parts of the header in position for attaching the header to the windshield or, if they are attached, for maintaining the attachment.

Fig. 12 is also a similar view of the header as seen in Fig. 10 showing the parts of the header in the position where the attaching means between the header and the windshield are tightened and locked.

Referring to the drawings in which like reference characters denote like parts in the following description, a convertible top 20 is shown fixedly secured to an automobile body 21 and 22 and detachably attached to the windshield 23 of the automobile body 21 at 24. The top 20 has a "number-one bow" 25 which is herein and generally referred to as the "header" 25.

As described in the hereinbefore referenced patents, linkage is provided in the top 20 and power units in the body 21 for raising the top 20 to the position shown in Fig. 1 and for collapsing the top 20 to a position adjacent the fixed connection 22.

The header 25, generally denoted by the dotted line of the top 20 adjacent the windshield 23, Fig. 1, is provided with apertures 29, Fig. 10, at either end for receiving dowels 26 therethrough and with a centrally located aperture 70 for receiving centrally located dowel 56 therethrough. The dowels are fixed to the windshield and are notched as indicated at 28, Fig. 5. Latch fingers 27, mounted in the header 25, are adapted to lie in the notch 28 of the dowels 26 for attaching the header 25 to the windshield 23 while cam 55, Fig. 11, is adapted to enter notch 28 of dowel 56 to further attach the header to the windshield as hereinafter more fully explained.

Links 40 connect the latch fingers 27 to operating member 44 at 45 and 46, Fig. 6, and it is to be noted that one link 40 is equipped with an arcuate end 61, Fig. 10, for bypassing shaft 47 upon which the operating member 44 is mounted and fixedly secured by peening.

Guides 41 are spot-welded to the header, Figs. 3 and 4, and enclose the latch fingers 27 while springs 43, riveted to the fingers 27 and links 40, resiliently urge the fingers 27 in the guides 41. Tabs 42, lanced from the header 25, are so disposed that they will contact the ends of the fingers 27 when the fingers move endwise outwardly toward the ends of the header. The tabs 42 are set on an angle so that they cam the fingers sidewise as the fingers 27 move endwise outwardly.

In addition, to the operating member 44, the shaft 47 is equipped with handle 48 for manually turning the shaft. Quadrant 49 is also secured on the shaft 47 by means of a pin 50 through its attached collar 51 thereby insuring that the quadrant will turn with the shaft together with the handle 48 and the operating member 44.

Lanced out of the quadrant 49 are projections 52 and 53, Figs. 7 and 9, while spring 54, attached to the header 25, presses against one or both of the stops 52 and 53 depending on the position of the quadrant.

The cam 55 coacts with the dowel 56 as previously stated and is carried by the operating member 44 and so turns therewith. Stop 60 is provided on the header 25 and limits the rotation of the operating member 44 in the direction of the arrow M by contacting the cam 55 as viewed in Fig. 10.

Referring to Figs. 10, 11, and 12, it can be seen that the fingers 27 carry bosses 62 which have an angular or cammed surface on the side of the guides 41 and are retractable into the guides 41. It is to be noted that the fingers 27 are themselves equipped with an angular or cammed surface 63 for effecting a pressure engagement with the dowels 26.

Preliminary to a statement on the operation of the device it can be generally remarked that the device has three positions or conditions which correspond to Figs. 10, 11 and 12 with Fig. 10 showing the device in its open, unattached and unattachable condition; Fig. 11 shows the automatically attachable or attached condition; and Fig. 12 shows the attached and locked condition.

In Fig. 12 it can be seen that the spring 54 presses upon the projection 53 of the quadrant 49 urging same in the direction of arrow P, while the arcuate end 61 of one line 40 provides a stop against this pressure by abutting the shaft 47 thereby locking the device in this condition. It can be further seen that the cam 55 has fully contacted the dowel 56 and the angular surfaces 63 on the fingers 27 have been fully drawn into the notches of the dowels 26. Also the bosses 62 have been fully drawn within the guides 41 so that the fingers 27 cannot move out of the notches of the dowels 26. The action between the dowels and cams forces the header 25 down on the windshield 23 to seal the joint therebetween.

Fig. 10 illustrates an entirely different condition in that this position of the various parts is manually held against the spring 54 which presses against projection 52 urging the quadrant and the other parts on the shaft 48 in the direction of arrow P. It is to be noted that here the cam 55 and the fingers 27 have been withdrawn from the notches of the dowels 56 and 26 respectively and that no connection is now possible between the header 25 and the windshield 23 via the dowels. The bosses 62 are outside the guides 41 and the tabs 42 have cammed the fingers 27 against the pressure of the springs 43 from their position over the apertures 29.

Fig. 11 shows the device with spring 54 pressing against both projections 52 and 53 thereby neutralizing its action and positioning the various parts as illustrated in this figure with the cam 55 neither abutting the stop 60 nor engaging the dowel 56. The bosses 62 are outside the guides 41 and the ends of the fingers 27 do not contact the tabs 42 while the spring 43 resiliently positions the fingers 27 over the apertures 29 as set by the guides 41. If the top 20 is erected or up, the fingers will lie in the notches of the dowels 26. If the top 20 is collapsed or down, or if the header 25 is off the windshield 23, then the fingers 27 are resiliently held over the apertures 29 by the springs 43 and guides 41.

In operation, assuming the top 20 is down or collapsed, and the various parts of the device are as shown in Fig. 11, the operator causes the top lift mechanism to elevate or erect the top 20 and when the header 25 comes down on the windshield 23 the pointed ends of the dowels 26 and 56 enter the apertures 29 and 70 respectively guiding the header into proper position. As the dowels 26 enter the apertures 29 they contact the fingers 27 and move them aside against the springs 43, and as the dowels 26 complete their entry, the springs 43 return the fingers 27 into the notches 28 of the dowels 26 thereby automatically latching the header 25 to the windshield 23 via the fingers 27 and the dowels 26.

The operator then grasps the handle 48 and turns it in the direction of arrow P until the end 61 on one link 40 abuts the shaft 47 stopping the movement. This turning rotates the quadrant 49 moving the projection 53 to the position shown in Fig. 12 where the spring 54 presses against same and urges the end 61 against the shaft 47 which locks the mechanism in the condition illustrated by Fig. 12. Also, this rotation of the shaft 47 turns the operating member 44 from its position of Fig. 11 to that of Fig. 12 and carries the cam 55 into the notch of the dowel 56 and rotates the pivot points 45 and 46 slightly past center on the shaft 47 which aids the spring 54 in locking the parts in this position. As the pivot points 45 and 46 rotate they draw the links 40 inwardly and draw the cammed surfaces 63 on the fingers 27 into the notches of the dowels 26 and draw the bosses 62 within the guides 41 which prevents the fingers 27 from slipping or jumping out of the notches of the dowels 26. As the cam 55 and the camme surfaces 63 enter the dowel notches the header 25 is forced down on the windshield 23 with pressure. The top 20 is now in its erected and locked position.

To collapse the top 20, the operator grasps the handle 48 and turns same in the direction of arrow M rotating the shaft 47, quadrant 49, and operating member 44 from the positions illustrated by Fig. 12, through that of Fig. 11, to that of Fig. 10 where he manually holds same until the top lift power mechanism lifts the header off the windshield. It is necessary for the operator to hold the handle 48 as the spring 54 is pressing against the projection 52 urging same in arrow P direction. This turning in arrow M direction has withdrawn the cam 55 from the notch in dowel 56 and has thrust the links 40 and fingers 27 outwardly so that the fingers 27 contact the angularly set tab 42 which cams the fingers out of the notches of the dowels 26. As the cams 55 and fingers 27 are disassociated with the dowels 56 and 26 respectively, the header 25 is disconnected from the windshield 23 and may be moved off by the power lift.

When the header 25 is free of the windshield 23 the operator releases the handle 48 and the spring 54 by pressing on the tab 52, rotates the quadrant 49, shaft 47, and operating member in the direction of arrow P until projection 53 contacts the spring 54 neutralizing its power as the spring now presses against both projections 52 and 53 as illustrated by Fig. 11.

The device is now in the condition of Fig. 11 with the fingers 27 retracted from contact with tabs 42 and lying over the apertures 29 and this is the condition of the device while the top 20 is in its collapsed condition.

When the operator desires to again raise the top it is only necessary for him to cause the top lift power mechanism to raise the top and the header 25, as it is forced down on the windshield 23, will automatically attach itself thereto as hereinbefore explained.

It can thus be seen that the invention provides a header for a convertible top which will automatically attach itself to the windshield when the power top lift places the header thereon. Also that the operator can then manually effect a pressure engagement between the header and windshield by merely turning the handle approximately one quarter turn which action at the same time locks the mechanism. Also, the operator by less than a half turn can unlock and detach the header from the windshield so that the top may be lowered.

While the invention has been shown and described in detail it is to be understood that the same is to be limited only by the appended claims as many changes may be made without departing from the spirit and scope of the invention.

What is claimed:

1. In an automobile convertible top, a header having apertures for receiving dowels attached to the automobile body and having keeper means thereon, a shaft rotatably mounted in said header, a handle secured on said shaft for manually rotating said shaft, a quadrant secured on said shaft, stops mounted on said quadrant, a spring adapted to engage said stops for yieldably holding said shaft in a predetermined position, an operating member axially secured on said shaft, links pivotally connected off-center to said operating member forming a crank connection between said operating member and said links, latch fingers constituting the ends of said links and adapted to engage said keeper means, guides limiting the lateral movement of said latch fingers over the apertures in said header, and tabs angularly set on said header for engaging the ends of said latch fingers, said fingers being disposed over said apertures to engage said keeper means when said shaft is in said position and said tabs being effective to cam said fingers from over said apertures upon movement of said shaft in one direction from said position.

2. In an automobile convertible top, a header having apertures for receiving dowels attached to the automobile body and having keeper means thereon, a shaft rotatably mounted in said header, a handle secured on said shaft for manually rotating said shaft, a quadrant secured on said shaft, stops mounted on said quadrant and a spring adapted to engage said stops for yieldably holding said shaft in a predetermined position, an operating member axially secured on said shaft, links pivotally connected off-center to said operating member forming a crank connection between said operating member and said links, latch fingers constituting the ends of said links and adapted to engage said keeper means, guides limiting the lateral movement of said latch fingers over the apertures in said header, tabs angularly set on said header for engaging the ends of said latch fingers, and locks on said fingers adapted to engage said guides, said fingers being disposed over said apertures to engage said keeper means when said shaft is in said position and said tabs being effective to cam said fingers from over said apertures upon movement of said shaft in one direction from said position.

3. In an automobile convertible top, a header having apertures for receiving dowels attached to the automobile body and having keeper means thereon, a shaft rotatably mounted in said header, a handle secured on said shaft for manually rotating said shaft, a quadrant secured on said shaft, stops mounted on said quadrant and a spring adapted to engage said stops for yieldably holding said shaft in either of two positions, an operating member axially secured on said shaft, links pivotally connected off-center to said operating member forming a crank connection between said operating member and said links, latch fingers constituting the ends of said links and adapted to engage said keeper means, guides limiting the lateral movement of said latch fingers over the apertures in said header, tabs angularly set on said header for engaging the ends of said latch fingers to cam said fingers from over said apertures, bosses on said fingers adaptable to engage said guides to lock said fingers over said apertures, springs on said links urging said fingers over said apertures in said header; said operating member being so adapted that when said shaft is on one of said positions said fingers are yieldably held over said apertures by said springs and manual rotation of said shaft in one direction from said one of said positions extends said links to engage said angularly set tabs, and manual rotation of said shaft in the opposite direction to the other of said two positions retracts said links from engagement with said tabs and draws said bosses within said guides to lock said fingers over said apertures.

4. A self-attaching header for the top of a convertible automobile having dowels attached to the automobile body and including keeper means, said header having apertures adapted to receive said dowels, latch means mounted on said header, manually operable means mounted on said header and operable to move said latch means between a first position in which it overlies said apertures and a second position in which it is displaced from said apertures, means operable when said latch means is in said first position to automaticaly effect engagement of said keeper means by said latch means upon said top being moved to a predetermined position relative to said body, said latch means being inoperative to engage said keeper means when in said second position, and means including a cam element operable by said manually operable means when said top is in said predetermined position and said header is attached to said body by said latch means, to engage said keeper means and draw said header toward and firmly lock it in contact with said body.

5. A self-attaching header for the top of a convertible automobile having dowels, including keeper means thereon, attached to the automobile body, said header having spaced apertures for receiving said dowels, a manually operable handle mounted on said header, latch fingers individual to said apertures, means operatively connecting said latch fingers to said handle for longitudinal movement by said handle, guide means for controlling lateral movement of said fingers between a first position in which said fingers extend over said apertures and a second position in which said fingers are clear of said apertures, spring means urging said fingers toward said first position, and cooperating means on said fingers and said header for camming said fingers to said second position against the action of said spring means upon a predetermined longitudinal movement of said fingers in one direction by said handle.

6. A self-attaching header for the top of a convertible automobile having dowels, including keeper means thereon, attached to the automobile body, said header having spaced apertures for receiving said dowels, a manually operable handle mounted on said header, latch fingers individual to said apertures, means operatively connecting said latch fingers to said handle for longitudinal movement by said handle, guide means for controlling lateral movement of said fingers between a first position in which said fingers extend over said apertures and a second position in which said fingers are clear of said apertures, spring means urging said fingers toward said first position, cooperating means on said fingers and said header for camming said fingers to said second position against the action of said spring means upon a predetermined longitudinal movement of said fingers in one direction by said handle, and other cooperating means on said fingers and said header for camming said fingers to and locking them in said first position upon a predetermined longitudinal movement of said fingers in the opposite direction by said handle.

7. A self-attaching header for the top of a convertible automobile having dowels, including keeper means thereon, attached to the automobile body, said header having spaced apertures for receiving said dowels, a manually operable handle mounted on said header, latch fingers individual to said apertures, means operatively connecting said latch fingers to said handle for longitudinal movement by said handle, guide means for controlling lateral movement of said fingers between a first position in which said fingers extend over said apertures and a second position in which said fingers are clear of said apertures, spring means surging said fingers toward said first position, cooperating means on said fingers and said header for camming said fingers to said second position against the action of said spring means upon a predetermined longitudinal movement of said fingers in one direction by said handle, other cooperating means on said fingers and said header for camming said fingers to and locking them in said first position upon a predetermined longitudinal movement of said fingers in the opposite direction by said handle, means on said latch fingers adapted to engage and cooperate with said keeper means to draw said header toward and into engagement with said automobile body upon a predetermined longitudinal movement of said fingers.

8. A self-attaching header for the top of a convertible automobile having dowels attached to the automobile body and including keeper means thereon, said header having spaced apertures for receiving said dowels and comprising a centrally disposed manually operable handle, an operating member secured to said handle, links pivotally connected to and extending outwardly from said operating member toward the ends of the header, latch fingers attached to the ends of said links and adapted to engage said keeper means, guides controlling said fingers, and springs urging said fingers to a position over the apertures in the header determined by said guides, said fingers being adapted to be displaced from over said apertures by engagement with said dowels and returned to a position over said apertures for engaging said keeper means upon movement of said top to a predetermined position relative to said automobile body.

9. In a self-attaching header for an automobile convertible top having apertures at either end thereof for receiving dowels attached to the car body and having keeper means thereon, a centrally disposed manually operable handle, an operating member secured to said handle, links pivotally connected to and extending outwardly from said operating member toward the ends of the header, latch fingers attached to the ends of said links and adapted to engage said keeper means, said latch fingers being movable laterally between an operative position over said apertures and an inoperative position out of alignment with said apertures, guide means preventing lateral movement of said latch fingers beyond said operative position in one direction and beyond said inoperative position in the other direction, springs for yieldably maintaining said fingers in said operative position, said fingers being adapted to be displaced laterally from said operative position by engagement with said dowels and returned to said operative position to engage said keeper means upon movement of said top to a predetermined position relative to said car body.

10. A self-attaching header for the top of a convertible automobile having dowels attached to the automobile body and including keeper means thereon, said header having spaced apertures for receiving said dowels and comprising a centrally disposed manually operable handle, an operating member secured to said handle, links pivotally connected to and extending outwardly from said operating member toward the ends of the header, latch fingers attached to the ends of said links and adapted to engage said keeper means, guides controlling said fingers, springs urging said fingers to a position over the apertures in the header determined by said guides, tabs located on the header adjacent said fingers adaptable to move the fingers against the pressure of said spring away from the apertures in the header when said fingers are moved outwardly by said operating member and said links by turning said handle.

11. A self-attaching header for the top of a convertible automobile having dowels attached to the automobile body and including keeper means thereon, said header having spaced apertures for receiving said dowels and comprising a centrally disposed manually operable handle, an operating member secured to said handle, links pivotally connected to and extending outwardly from said operating member toward the ends of the header, latch fingers attached to the ends of said links and adapted to engage said keeper means, guides controlling said fingers, springs urging said fingers to a position over the apertures in the header determined by said guides, bosses located on said fingers adjacent said guides adapted to engage said guides when said fingers are moved inwardly by said operating member and said links by turning said handle.

12. A self-attaching header for the top of a convertible automobile having dowels attached to the automobile body and including keeper means thereon, said header having spaced apertures for receiving said dowels and comprising a centrally disposed manually operable handle, an operating member secured to said handle, links pivotally connected to and extending outwardly from said operating member toward the ends of the header, latch fingers attached to the ends of said links and adapted to engage said keeper means, guides controlling said fingers, springs urging said fingers to a position over the apertures in the header determined by said guides, cooperating means on said fingers and said header for locking said fingers in a position over said apertures when said fingers are moved inwardly by said operating member and said links by turning said handle.

13. A self-attaching header for the top of a convertible automobile having dowels attached to the automobile body and including keeper means thereon, said header having spaced apertures for receiving said dowels and comprising a centrally disposed manually operable handle, an operating member secured to said handle, links pivotally connected to and extending outwardly from said operating member toward the ends of the header, latch fingers attached to the ends of said links and adapted to engage said keeper means, guides controlling said fingers, springs urging said fingers to a position over the apertures in the header determined by said guides, tabs located on the header adjacent said fingers adaptable to move said fingers against the pressure of said springs away from the apertures in the header when said fingers are moved outwardly by said operating member and said links by turning said handle, bosses located on said fingers adjacent said guides adapted to engage said guides when said fingers are moved inwardly by said operating member and said links by turning said handle.

14. A header lock adapted for fastening a vehicle top to a vehicle frame having a recessed member thereon, said lock comprising a cam, means supporting said cam on said top for rotation about a fixed axis, said cam having an open, latch and locked position relative to said recessed member, means comprising a manually operable handle for rotating said cam in one direction to a locked position to move said cam into the recess of said member and cam said top into engagement with said frame, said handle being operable to rotate said cam in an opposite direction to move said cam to an open position, and yieldable means operable when said cam has been released subsequent to movement of said cam to an open position to urge said cam to a latch position.

LEWIS D. MILHAN.

REFERENCES CITED

The following references are of record in the file of this patent:

UNITED STATES PATENTS

| Number | Name | Date |
|---|---|---|
| 1,119,412 | Donegan et al. | Dec. 1, 1914 |
| 1,171,918 | Bair | Feb. 15, 1916 |
| 1,899,857 | Dubos | Feb. 28, 1933 |
| 2,305,715 | Keller | Dec. 22, 1942 |
| 2,360,524 | Simpson | Oct. 17, 1944 |
| 2,411,945 | Vigmostad et al. | Dec. 3, 1946 |

FOREIGN PATENTS

| Number | Country | Date |
|---|---|---|
| 400,377 | Great Britain | Oct. 26, 1933 |
| 413,116 | Great Britain | July 12, 1934 |
| 528,303 | Great Britain | Oct. 25, 1940 |
| 580,284 | Great Britain | Sept. 3, 1946 |